3,189,553
PAINT STRIPPING COMPOSITIONS
Henry B. Lange, Westfield, N.J., assignor to Merck & Co., Inc., Rahway, N.J., a corporation of New Jersey
No Drawing. Filed Mar. 31, 1960, Ser. No. 18,859
7 Claims. (Cl. 252—165)

This invention relates to paint stripping formulations and more particularly to non-volatile paint stripping formulations. Specifically, this invention relates to paint stripping formulations having as an active ingredient, 2,5-bis(chloromethyl)tetrahydrofuran.

2,5-bis(chloromethyl)tetrahydrofuran may be prepared by means of the reaction of 2,5-dimethylol tetrahydrofuran with thionyl chloride in the presence of pyridine. This method of preparation is described in detail in J. Chem. Soc., 155 (1948) (Newth & Higgins).

The rapid growth of the paint and coating industry over the last decade has resulted in a wide variety of film and film-producing materials now being used for a multitude of applications. With this very large selection, no one paint and film stripping formulation is equally satisfactory for all services. It is, therefore, not surprising to find that there is a constant effort to devise paint stripping formulations that will have a broad area of utility. There are two broad types of paint removers; the alkaline type and the solvent type. The alkaline type is generally a strong aqueous solution of caustic soda which has a simple disintegrating action on the varnish or paint. Because long exposure to an alkaline remover damages wood, aluminum, zinc, cadmium, and several other metals, the application of alkaline paint strippers is limited.

The most popular paint remover is the solvent type. A modern solvent-type paint stripping formulation usually has five principal ingredients:

(1) A volatile solvent which is the major active ingredient,
(2) A wax to reduce volatility,
(3) A dispersing agent for the wax,
(4) A co-solvent to reduce flammability,
(5) A surface active agent to promote penetration and make the product rinseable.

Today, the most widely used paint stripping formulations contain methylene chloride as the active ingredient. Methylene chloride is practically non-flammable and is least toxic of the chlorinated hydrocarbons having paint stripping properties, such as carbon tetrachloride, ethylene dichloride, chlorobenzenes, dichloroethyl ether, and propylene dichloride. Unfortunately, due to its high vapor pressure (one atmosphere at 41° C.), long periods of contact with coated surfaces cannot be accomplished using methylene chloride alone. Hence, substances such as paraffin wax must be added to methylene chloride formulations as evaporation retardants. The wax crystallizes out to form a film which will lock in the solvents until they get their work done. It follows that methylene chloride by itself cannot be used in spray paint stripping formulations and aerosol paint stripping formulations, but must be used along with an evaporation retardant, such as crude scale wax.

Methylene chloride, when used in paint stripping formulations to strip paint from vertical surfaces, must contain thickeners as well as the wax hereinbefore described. The function of the thickeners is to increase the viscosity of the formulations, thereby preventing the methylene chloride from gravitating down the surfaces before it has a chance to complete its operation. Examples of thickeners are ethyl cellulose, polyethylene glycol and nitrocellulose. A typical spray paint stripping formulation in use today is as follows:

| | Percent |
|---|---|
| (1) Methylene chloride | 80.96 |
| (2) Paraffin wax | 2.43 |
| (3) Methyl cellulose (1500 cps.) | 0.61 |
| (4) Wetset Concentrated | 3.03 |
| (5) Water glass | 0.85 |
| (6) Phenol, solid | 12.12 |

Wetset Concentrated is an alkyl-aryl wetting agent.

After spraying formulations containing wax as evaporation retardants and thickeners, the waxes and thickeners must then be flushed off by an additional operation, known as solvent flushing.

It is, therefore, an object of this invention to prepare a paint stripping formulation which has a relatively non-volatile active ingredient.

Another object of this invention is to prepare a paint stripping formulation, the active ingredient of which will remain in full strength on a coating to be stripped for as long a period as desired.

Other objects of this invention will appear as the description proceeds.

I have discovered that a paint stripping formulation containing 2,5-bis(chloromethyl)tetrahydrofuran as the active ingredient, will remove paint of various types in as short a period as any presently known paint stripping formulations, will not volitilize after application, can be spread without the use of evaporation retardants, will work satisfactorily on vertical and curved surfaces, and will easily and efficiently remove certain coatings which heretofore have been extremely difficult to remove, such as epoxy coatings and nitrocellulose coatings.

In addition, I have found that the addition of a finely-divided silicon dioxide to the formulation containing 2,5-bis(chloromethyl)tetrahydrofuran increases the viscosity of the paint stripper to such an extent that it will prevent the downward flow of the paint stripper when it is applied to vertical walls. The silicon dioxide greatly increases the viscosity of the paint stripping formulation, but unlike waxes, does not remain coated on the stripped surface after removal of the paint stripping agent, as by a water wash. The compositions of the invention may also contain methylene chloride with or without a thickening agent. The thickening agent may be finely divided silicon dioxide, polyethylene glycol, methyl cellulose, ethyl cellulose, cellulose acetate, or nitro celulose. Preferably they contain from 50% to 99% by weight of 2,5-bis(chloromethyl)tetrahydrofuran and up to 15% by weight of the thickener, when employed, and up to 25% by weight of methylene chloride, when employed. Most preferably, the compositions contain from 1–15% by weight of silicon dioxide, and at least 10% by weight of methylene chloride. The compositions may also contain methanol or toluene as solvents as shown by the examples appearing hereinafter.

In testing the paint stripping formulations of the present invention, hereinafter described in the examples, the following general procedure is utilized:

A coating is formed on a metal panel by either dipping or painting or spraying on to the panel a solution of the coating composition. The coated panel is then dried, either by means of baking in an oven or by air-drying. The final film thickness is then measured. A formulation containing 2,5-bis(chloromethyl)tetrahydrofuran is then brushed on to the coated panel. The time required for softening the coating is recorded and the time required for "loosening" the coating is recorded. The coating is considered "loosened" when it can be easily stripped by running a blade over the coated surface.

The following examples are illustrative of the invention.

Example 1

An alkyd resin coating was formed on a steel panel 2″ wide and 4" long by painting onto the panel a solution of an alkyd resin in mineral spirits. The solution contained 60% solids and 40% mineral spirits. The alkyd resin was made from 23% phthalic anhydride, 60% soybean oil, and 17% pentaerithrytol. The coated panel was then air dried. The final film thickness was 6 mils.

A formulation containing 83% by weight of 2,5-bis(chloromethyl)tetrahydrofuran, 7.5% by weight of methanol and 9.5% by weight of Carbowax 4000 (a polyethylene glycol having an average molecular weight of 3000–3700) was prepared by mixing the ingredients and stirring until the Carbowax is dissolved.

2 ccs. of this formulation was brushed onto the coated steel panel. One minute after the application of the above formulation, the paint film wrinkled and appeared to be loosened. The paint film was easily removed by running a scraper blade along the surface. The steel surface was then flushed with water. After flushing, the surface was clean and ready for repainting.

*Example 2*

A buna-n-phenolic coating was formed on an aluminum panel which was 2" wide and 4" long, by painting onto said panel a buna-n-phenolic coating. The coated panel was then air-dried. The final film thickness was 6 mils. A paint stripping formulation as described in Example 1 was brushed onto the coated aluminum panel. Thirty seconds after application of the above paint stripping formulation, the coating became noticeably soft. Sixty seconds after the application of the paint stripping formulation, the coating was easily stripped as by the edge of a scraper blade. The aluminum surface was then flushed with water. After flushing, the surface was clean and ready for repainting.

*Example 3*

A lacquer coating was formed on a steel panel by painting a nitrocellulose lacquer finish onto it. The steel panel was 2" wide and 4" long. The nitrocellulose lacquer had the following composition:

|   | Percent by weight |
|---|---|
| (1) Nitrocellulose–½ sec. RS | 50 |
| (2) Rezyl 387–5 | 50 |

Rezyl 387–5 is an alkyd resin made from 41% phthalic anhydride, containing 55% solids in a solvent of xylene.

After brushing the coating onto the surface, it was baked at 180° F. for 30 minutes. 2 ccs. of the formulation described in Example 1 was brushed onto the coated panel. Three minutes after the application of the paint stripping formulation, the paint film loosened and the film separated from the steel surface. The steel surface was then flushed with water. After flushing, the surface was clean and ready for repainting.

*Example 4*

A paint film was formed on a steel panel by painting onto the said panel a commercial rubber-based paint containing a styrene-butadiene resin. The paint had the following formulation:

|   | Percent |
|---|---|
| (1) Titanium dioxide | 20 |
| (2) Sodium, calcium and magnesium silicates | 28 |
| (3) Styrene-butadiene resin | 14.5 |
| (4) Linseed oil | 37 |

The coated panel was then air-dried. The final film thickness was 6 mils. 2 ccs. of the paint stripping formulation described in Example 1 was brushed on to the coated panel. Within 30 seconds the dried film was lifted off the surface as by running a scraper blade along the surface. The steel surface was then flushed with water. After flushing, the surface was clean and ready for repainting.

*Example 5*

An epoxy resin coating solution in xylene was sprayed onto a steel panel which was 2" wide and 4" long. The formulation of the epoxy coating was as follows:

|   | Percent |
|---|---|
| (1) Epon 1007 | 35 |
| (2) Melmac 245–8 | 15 |
| (3) Titanium dioxide | 45 |
| (4) Hansa 5G | 5 |

Epon 1007 is an epoxy resin having an epoxide equivalent of 1600–1900 and a hydroxy equivalent of 190.

Melmac 245–8 is a melamine resin.

Hansa 5G is a yellow paint pigment which is a water-insoluble azo compound.

The coated panels were then baked for 30 minutes at a temperature in the range of 250–270° F. 5 ccs. of a paint stripping formulation containing 92% by weight of 2,5-bis(chloromethyl)tetrahydrofuran and 8% by weight of a finely-divided form of silicon dioxide having a particle size in the range of 0.015–0.020 micron, and an apparent bulk density in the range of 2.5–3.5 pounds per cubic foot, was brushed onto the coated steel panel. Two minutes after the application of the paint stripping formulation, the paint coating was easily removed as by pushing a scraper blade along the surface of the coated panel. The steel surface was then flushed with water. After flushing the surface was clean and ready for repainting.

*Example 6*

A polyurethane coating was formed on a steel panel 2" wide and 4" long. The coated panel was then air-dried. The final film thickness was 6 mils. A paint stripping formulation as described in Example 5 was brushed onto the coated steel panel. Two minutes after the application of the paint stripping formulation, the coating was easily stripped by the edge of a scraper blade. The steel surface was then flushed with water. After flushing, the surface was clean and ready for repainting.

*Example 7*

An acrylic coating was formed on a steel panel 2" wide and 4" long by painting onto the panel a solution having the following composition:

|   | Percent |
|---|---|
| (1) Acryloid B–72 | 20 |
| (2) Vinylite VAGH | 15 |
| (3) Toluene | 65 |

Acryloid B–72 is an acrylic ester resin having a molecular weight in the range of 480–640 contained in a toluene solution (40% by weight solids).

Vinylite VAGH contains 91% polyvinyl chloride, 3% polyvinyl acetate, and 6% polyvinyl alcohol. Film thickness was 6 mils. A paint stripping formulation as described in Example 5 was brushed onto the coated steel panel. Two minutes after application of the paint stripping formulation, the coating was loosened to such an extent that it was easily removed by passing a scraping blade across the surface of the film. The steel surface was then flushed with water. After flushing, the surface was clean and ready for repainting.

*Example 8*

An alkyd resin coating was formed on a steel panel 2" wide and 4" long by painting onto the panel a solution of an alkyd resin in mineral spirits having a composition of the alkyd resin solution used in Example 1. The coated panel was then air-dried. The final film thickness was 6 mils.

A formulation containing 83% by weight of 2,5-bis(chloromethyl)tetrahydrofuran, 8.1% by weight of toluene, 7.5% by weight Carbowax 4000 (polyethylene glycol having an average molecular weight of 3700) and 2% by weight of morpholine, was prepared. 2 ccs. of this formulation was brushed onto the coated steel panel. One minute after application of the above paint stripping formulation, the paint seemed loosened and was easily removed as by running a scraper blade along the surface. The steel surface was then flushed with water. After flushing, the surface was clean and ready for repainting.

Instead of morpholine, 2% by weight of 5-aminomethyl-2-tetrahydrofurfuryl alcohol may be used in the paint stripping formulation.

*Example 9*

A paint film was formed on a steel panel which was 2" wide and 4" long by brushing onto the said panel a linseed oil-based paint, which had the following formulation:

|     |     | Percent |
| --- | --- | --- |
| (1) | Linseed oil boiled | 52.0 |
| (2) | Cobalt naphthenate | 2.1 |
| (3) | Rutile (titanium dioxide) | 18.8 |
| (4) | Hansa 5G | 22.4 |
| (5) | Mineral spirits | 5.2 |

Hansa 5G is a yellow paint pigment which is a water-insoluble azo compound.

The coated panel was then air-dried. The final film thickness was 6 mils. A paint stripping formulation described in Example 8 was brushed onto the coated steel panel. Forty seconds after application of the above paint stripping formulation, the coating was easily stripped as by running the edge of a scraper blade across the surface. The steel surface was then flushed with water. After flushing, the surface was clean and ready for repainting.

*Example 10*

A nitrocellulose lacquer coating was formed on a steel panel as in Example 3.

A formulation containing 70% by weight of 2,5-bis(chloromethyl)tetrahydrofuran, 15% by weight of methylene chloride, 8% by weight of methanol and 7% by weight of Carbowax 4000 (a polyethylene glycol having an average molecular weight of 3000–3700) was prepared.

2 ccs. of this formulation was brushed onto the coated steel panel. One minute after the application of the above formulation, the paint film wrinkled and appeared to be loosened. The paint film was easily removed by running a scraper blade along the coated surface. The surface was then flushed with water. After flushing, the surface was clean and ready for repainting.

*Example 11*

An epoxy resin coating was formed on a steel panel as in Example 5. A formulation containing 65% by weight of 2,5-bis(chloromethyl)tetrahydrofuran, 25% by weight of methylene chloride and 10% by weight of a finely-divided form of silicon dioxide having a particle size in the range of 0.015–0.020 micron, and an apparent bulk density in the range of 2.5–3.5 pounds per cubic foot was prepared.

2 ccs. of this formulation was brushed onto the coated steel panel. One minute after the application of the above formulation, the paint film wrinkled and appeared to be loosened. The paint film was easily removed by running a scraper blade along the coated surface. The surface was then flushed with water. After flushing, the surface was clean and ready for repainting.

*Example 12*

A nitrocellulose lacquer coating was formed on a steel panel as in Example 3.

2 ccs. of the paint stripping formulation described in Example 11 was brushed onto the coated steel panel. One minute after the application of the paint stripping formulation, the paint film wrinkled and appeared to be loosened. The paint film was easily removed by running a scraper blade across the coated surface. The surface was then flushed with water. After flushing, the surface was clean and ready for repainting.

*Example 13*

An epoxy resin coating was formed on a steel panel as in Example 5. 2 ccs. of the paint stripping formulation described in Example 10 was brushed onto the coated steel panel. One minute after application of the paint stripping formulation, the paint film wrinkled and appeared to be loosened. The paint film was easily removed by running a scraper blade across the coated surface. After flushing, the stripped surface was then flushed with water. After flushing, the surface was clean and ready for repainting.

I claim as my invention:

1. A paint stripping composition comprising at least 50–99 weight percent of 2,5-bis(chloromethyl)tetrahydrofuran, from 0–15 weight percent of a thickener selected from the group consisting of finely divided silicon dioxide, polyethylene glycol, methyl cellulose, ethyl cellulose, cellulose acetate, and nitro cellulose, and from 0–25 weight percent of methylene chloride.

2. The paint stripping composition according to claim 1 wherein the thickener is finely divided silica present in an amount between 1 and 15 weight percent.

3. The paint stripping composition according to claim 2 wherein there is additionally present from 0 to about 8 weight percent of a solvent selected from the group consisting of methanol and toluene.

4. A paint stripping composition comprising from 65–92 weight percent of 2,5-bis(chloromethyl)tetrahydrofuran, from 0–8 weight percent methanol, from 0–10 weight percent of silica, and from 0–25 weight percent of methylene chloride.

5. A process for removing paint coatings from surfaces comprising contacting a paint coating with 2,5-bis(chloromethyl)tetrahydrofuran, thereby to loosen said paint coating and mechanically removing said loosened paint coating.

6. The process according to claim 5 wherein said 2,5-bis(chloromethyl)tetrahydrofuran is present in a composition comprising at least 50–99 weight percent of 2,5-bis(chloromethyl)tetrahydrofuran, from 0–15 weight percent of a thickener selected from the group consisting of finely divided silicon dioxide, polyethylene glycol, methyl cellulose, ethyl cellulose, cellulose acetete, and nitro cellulose, and from 0–25 weight percent of methylene chloride.

7. The process according to claim 5 wherein said 2,5-bis(chloromethyl)tetrahydrofuran is present in a composition comprising from 65–92 weight percent of 2,5-bis(chloromethyl)tetrahydrofuran, from 0–8 weight percent methanol, from 0–10 weight percent of silica, and from 0–25 weight percent of methylene chloride.

References Cited by the Examiner

UNITED STATES PATENTS 2,288,588  6/42  Rieche et al. _____ 260—346.1
2,913,418  11/59  Sohngen et al. _____ 252—163

OTHER REFERENCES

J. Chem. Soc. (London), Newth et al., part 1, pages 155–8 (1948).

Soap and Chemical Specialties, Berkeley et al., I, June 1956, pages 175, 177, 179, 180.

Soap and Chemical Specialties, Berkeley et al., II, October 1956, Pages 152, 157, 159, 161.

ALBERT T. MEYERS, *Primary Examiner.*

JULIUS GREENWALD, *Examiner.*